July 8, 1924.
A. L. MILLIGAN
1,500,514
INSECTICIDE CONTAINER AND DISTRIBUTOR
Filed March 30, 1922
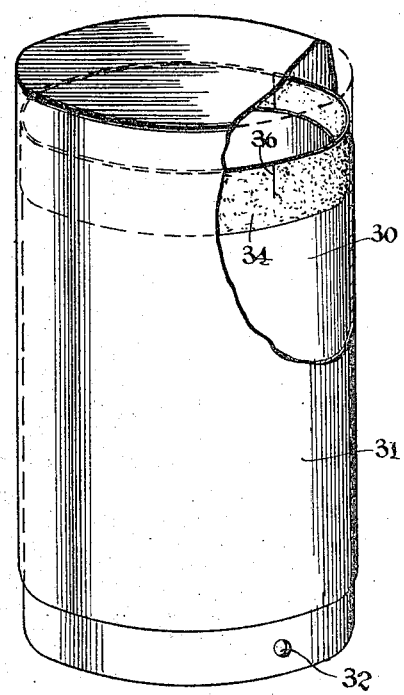
WITNESSES
INVENTOR
A. L. Milligan,
BY
ATTORNEYS Patented July 8, 1924.

1,500,514

UNITED STATES PATENT OFFICE.

ABB LEMUEL MILLIGAN, OF ATLANTA, GEORGIA.

INSECTICIDE CONTAINER AND DISTRIBUTOR.

Application filed March 30, 1922. Serial No. 548,007.

*To all whom it may concern:*

Be it known that I, ABB L. MILLIGAN, a citizen of the United States, and resident of Atlanta, in the county of Fulton and State of Georgia, have invented certain new and useful Improvements in Insecticide Containers and Distributors, of which the following is a specification.

This invention relates to insecticide containers and distributors.

An important object of this invention is to provide novel means whereby the original container of an insecticide may be utilized to eject the insecticide in spray formation thereby dispensing with the necessity of transferring the insecticide from the original container to a separate dispensing device such as a bellows.

A further object of the invention aims to provide an insecticide container and distributor having novel means whereby the same is positively and effectively sealed so that when being handled in trade, the insecticide will not be accidentally discharged.

A further object of the invention is to provide an insecticide container and distributor which may be conveniently prepared for use, which is of highly simplified construction, durable in use and cheap to manufacture.

Other objects and advantages of the invention will be apparent during the course of the following description.

In the accompanying drawing forming a part of this application—

The figure is a perspective of a form of the invention, a portion of the outer receptacle being broken away.

The form of the invention illustrated in the drawing comprises inner and outer sections or receptacles which are designated by the numerals 30 and 31 respectively and are arranged telescopically so as to act as a bellows for discharging air through an aperture 32 in the lower portion of the inner receptacle. It will be seen that when the sections are moved with relation to each other the air discharged through the opening 32 will pick up a quantity of insecticide and discharge it in spray formation.

The upper portion of the inner section 30 is provided with an annular strip 34 the upper edge of which is extended above the upper end of the inner section and is provided with a plurality of spaced transversely extending incisions 36 which define partly severed portions adapted for providing an air tight connection between the inner and outer sections. The strip 34 is confined between the inner and outer sections and prevents powder from lodging between the sections of the device.

From the foregoing description taken in conjunction with the accompanying drawing, it will be apparent that an insecticide distributor and container constructed in accordance with the invention may be cheaply manufactured and that the original container may be utilized as a dispenser for the insecticide therein.

In carrying out the invention the sections may be made round in cross section as illustrated in this application or square or oval shaped and it is to be understood that the form of the invention herewith shown and described is to be taken as a preferred example of the same and that such minor changes in the arrangement and construction of parts may be made as will remain within the spirit of the invention and the scope of what is claimed.

Having thus described the invention, what I claim is:—

An insecticide container and distributor comprising inner and outer telescoping sections, and an annular strip secured to the terminal portion of the inner section and having a plurality of transverse incisions defining a plurality of partly severed arcuate portions, said partly severed arcuate portions being adapted to provide a powder-tight connection between the inner and outer sections.

ABB LEMUEL MILLIGAN.